UNITED STATES PATENT OFFICE.

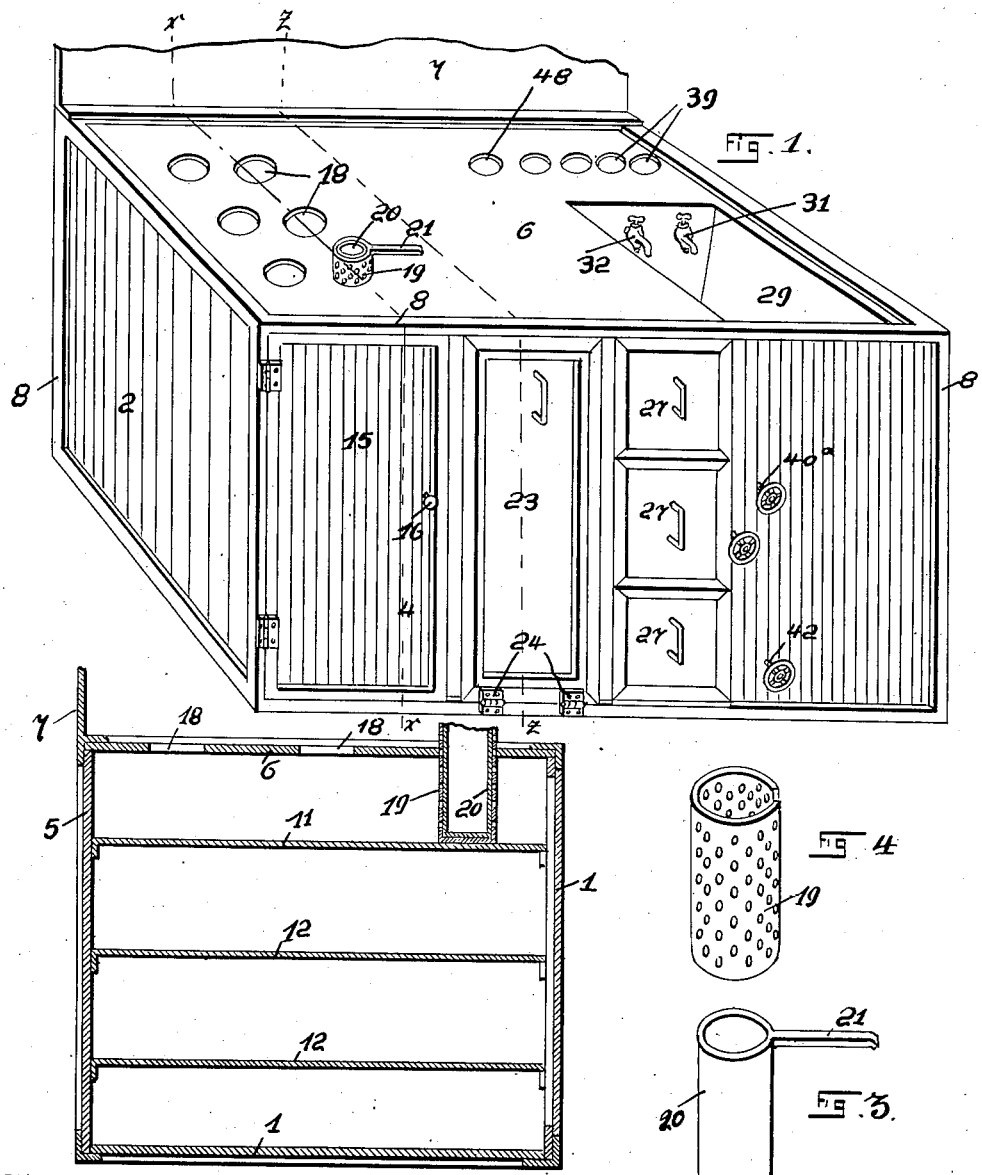

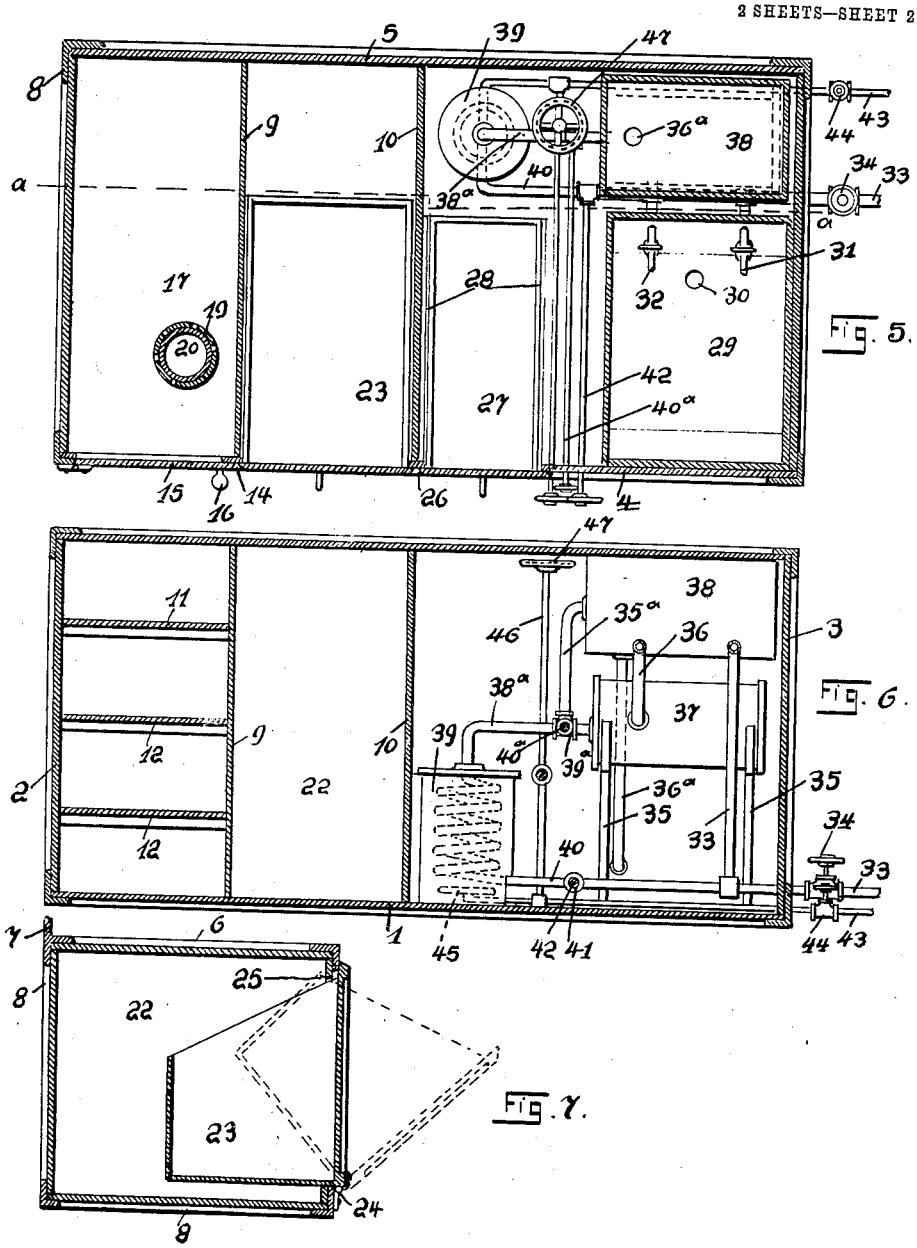

HENRY J. GERNER, OF CANTON, OHIO, ASSIGNOR TO MARY GERNER, OF CANTON, OHIO.

CABINET.

No. 863,981.            Specification of Letters Patent.            Patented Aug. 20, 1907.

Application filed November 27, 1906. Serial No. 345,387.

*To all whom it may concern:*

Be it known that I, HENRY J. GERNER, a citizen of the United States of America, residing at Canton, in the county of Stark and State of Ohio, have invented certain new and useful Improvements in Cabinets, of which the following is a specification, reference being had therein to the accompanying drawings.

This invention relates to cabinets designed for manufacturers of ice cream and similar frozen substances.

The invention aims to provide a novel form of cabinet wherein various compartments are provided for the various materials and instruments used by an ice cream manufacturer. In connection with the cabinet, I have devised a chilling or refrigeratory compartment, a heating compartment and a sink whereby various substances may be prepared upon the cabinet and the utensils and instruments used for such a purpose cleansed at any desired time.

To this end, my invention aims to provide a sanitary fixture or piece of furniture for confectionery shops, my cabinet being particularly designed for the preparation of various ingredients used in the manufacture of ice cream. For instance, it is essential that the gelatin ingredient of ice cream be properly prepared or it will be possible to distinguish and trace the gelatin in the frozen cream. It is a well known fact that the dissolution of gelatin in cream or milk has a tendency to sour and for this reason gelatin has been dissolved in water, although it is a well established fact that gelatin dissolved in milk or cream is more advantageously used in the production of fine and smooth ice cream. On account of the watchfulness and care necessary in dissolving gelatin in milk, water has been used, and in devising my improved cabinet I have aimed to provide novel means whereby gelatin may be properly prepared, said means obviating the trouble heretofore experienced in maintaining the gelatin in a perfect condition until it is ready to be used in a freezer or similar apparatus. The preparation of gelatin is simply one of the few ingredients or mixtures that may be concocted in connection with my improved cabinet, and after the detail construction of the cabinet has been fully understood, it will be apparent to those skilled in the manufacture of ice cream and similar substances that my improved cabinet forms a useful and inexpensive device for artisans having use for the same.

The detail construction of the cabinet will be presently described and then specifically pointed out in the appended claims, and referring to the drawing forming part of this specification, like numerals of reference designate corresponding parts throughout the several views, in which:—

Figure 1 is a perspective view of my cabinet, Fig. 2 is a transverse sectional view taken on the line x—x of Fig. 1, Fig. 3 is a perspective view of a receptacle used in connection with the cabinet, Fig. 4 is a perspective view of a perforated casing for the receptacles of the cabinet, Fig. 5 is a horizontal sectional view of the cabinet, directly beneath the slab or top plate thereof, Fig. 6 is a longitudinal sectional view taken on the line a—a of Fig. 5, and Fig. 7 is a transverse sectional view taken on the line z—z of Fig. 1, said view being upon a smaller scale.

The cabinet comprises a box-like structure having a base 1, and walls 2 and 3, a front wall 4, a rear wall 5, a top slab or plate 6, and a dash board 7. The walls are suitably connected together and protected upon their edges by binding strips 8, and said walls are preferably constructed of wood or a similar light and durable material.

In one end of the box-like structure are arranged two transverse partitions 9 and 10, and the space between the partition 9 and the end wall 2 is divided by horizontal partitions 11 and 12. The front wall 4 of the cabinet is provided with an opening 14 whereby easy access may be had to the partitions 12, which serve functionally as shelves. The opening 14 is closed by a hinged door 15, said door having a suitable handle 16. The partitions 12 are preferably used for supporting bottles of syrups and flavoring liquids used in the production of ice cream and confections. The space above the horizontal partition 11 is suitably lined and forms a refrigeratory compartment 17, access being had to said compartment through a plurality of openings 18 formed in the top plate or slab 6. In the compartment 17 is placed ice or a similar refrigeratory agent, and seating in the compartment 17 are perforated casings 19, one of which is shown in Figs. 1, 2 and 4. The casings 19 extend down through the openings 18 of the cabinet and prevent a receptacle 20 from being injured by the ice or freezing agent contained within the compartment 17. The receptacle 20 is provided with a suitable handle 21, whereby it may be easily manipulated and said receptacle is adapted to contain liquids or ingredients used in the production of ice cream. The compartment 22 formed between the partitions 9 and 10 contains a bin 23 hinged, as at 24, to the lower edge of an opening 25 formed in the front wall 4 of the cabinet. The bin 23 is constructed whereby it may be swung outwardly, and limited in its movement by the rear edge of said bin engaging the top edge of the opening 25. Gelatin and similar raw material used in the production of ice cream is placed in said bin. The front wall 4 of the cabinet is provided with a plurality of openings 26 to receive drawers 27, which slide between guides 28 erected in the cabinet adjacent to the partition 10.

Between the drawers 27 and the wall 3 of the cabinet is mounted a sink or tank 29, the upper edges of said sink or tank being flush with the plate or slab 6. The sink or tank is provided with a suitable drain opening 30 and with hot and cold water faucets or spigots 31 and 32. Cold water is supplied to the spigot 31 from a suitable supply pipe 33 entering the cabinet at the rear thereof, said pipe being provided with a valve 34. Hot water is supplied to the spigot or faucet 32 by a pipe 36 leading from a hot water tank 37, said tank being arranged beneath a tank 38 mounted in the rear of the sink 29, access being had to said tank through a plurality of openings 39 formed in the plate or slab 6. The tank 37, which is supported by brackets 35, communicates by a pipe 38ª with a suitable hot water heater 39. The hot water heater is supplied with cold water by a pipe 40 from the pipe 33, and the flow of water through said heater is controlled by a valve 41, the stem 42 of which extends forwardly between the drawers 27 and the sink 29, and through the front wall 4 of the cabinet, whereby the valve 41 can be adjusted. Hot water is supplied to the tank 38 by a pipe 35ª and is controlled by a conventional form of valve 39ª, the stem 40ª of which extends forwardly through the front wall 4 of the cabinet in order that the valve may be easily manipulated. The tank 38 is provided with a drain pipe 36ª leading to a suitable outlet. Gas to the hot water heater 39 is supplied through a pipe 43 having a suitable controlling valve 44 and a burner 45. The gas supply pipe 43 within the cabinet is provided with an upwardly extending pipe 46 carrying an ordinary burner 47, this burner being located beneath an opening 48 formed in the plate or slab 6.

The drawers 27 are employed for housing tools, instruments and utensils used by manufacturers of ice cream and the sink 29 supplied with hot and cold water is used for cleaning the tools or utensils after they have been used.

I have provided a burner 47 whereby certain preparations can be heated, while the tank 38 adapted to contain hot water, used for steaming preparations, some of which may have been prepared upon the burner 47 or in the refrigerator compartment of my improved cabinet. For instance, in the preparation of gelatin for use in ice cream, it is first prepared by maintaining it in a cool state in the compartment 17, and when it is to be used, it is removed from said compartment and immersed in the hot water contained within the tank 38 where the gelatin is dissolved in cream or milk, and then removed to be used in the making of ice cream.

In constructing my improved cabinet, I have aimed to combine certain devices heretofore constructed separately, and to provide a cabinet which will facilitate the preparation and production of ice cream or similar frozen substances.

I do not care to confine myself to the specific arrangement of the various devices of the cabinet as disclosed in the accompanying drawing, or to the detail construction of the cabinet, as such changesas are permissible by the appended claims, may be resorted to without departing from the spirit and scope of the invention.

What I claim and desire to secure by Letters Patent, is:—

1. In a cabinet, an inclosing framework, a top plate on said framework having a portion at one corner cut out, a sink supported in said frame beneath said cut out portion, a series of openings in said plate, a water receptacle supported in said frame beneath one series of openings, and a shelf in said frame beneath the other series of openings.

2. In a cabinet, an inclosing framework, a top plate on said frame having a portion at one corner cut out, a sink supported in said frame beneath said cut out portion, a cold water supply pipe leading to said sink, a water heater inclosed within the framework, a hot water tank within the framework having connection with said water heater and with said sink, and a water tank inclosed by the framework access to which is had through a series of openings in said top plate.

In testimony whereof I affix my signature in the presence of two witnesses.

HENRY J. GERNER.

Witnesses:
J. P. FAWCETT,
PETER J. COLLINS.